United States Patent [19]

Sutherlin et al.

[11] Patent Number: 5,426,175
[45] Date of Patent: Jun. 20, 1995

[54] DEASHING PROCESS FOR POLYOLEFINS

[75] Inventors: Dirk M. Sutherlin; Stephen R. Jardot, both of Bartlesville, Okla.

[73] Assignee: Phillips Petroleum Company, Bartlesville, Okla.

[21] Appl. No.: 66,838

[22] Filed: May 24, 1993

Related U.S. Application Data

[63] Continuation of Ser. No. 730,318, Jul. 15, 1991, abandoned.

[51] Int. Cl.[6] ............................................. C08F 6/28
[52] U.S. Cl. .................................. 528/486; 528/494; 528/495; 528/496
[58] Field of Search ................. 528/486, 494, 495, 496

[56] References Cited

U.S. PATENT DOCUMENTS

| | | | |
|---|---|---|---|
| 2,955,107 | 10/1960 | Metuchen et al. | 260/93.7 |
| 3,219,647 | 11/1965 | Dietz | 260/93.7 |
| 3,251,819 | 5/1966 | Ketley | 260/93.7 |
| 3,293,228 | 12/1966 | Takashi et al. | 260/93.5 |
| 3,489,735 | 1/1970 | Clark et al. | 260/88.2 |
| 3,489,736 | 1/1970 | Takahashi et al. | 260/88.2 |
| 3,560,471 | 2/1971 | Pietro | 260/93.7 |
| 3,755,500 | 8/1973 | Clark | 260/878 R |
| 4,048,415 | 9/1977 | Matsuzawa et al. | 526/119 |
| 4,065,610 | 12/1977 | DeBeukelaar et al. | 526/70 |
| 4,425,257 | 1/1984 | Miro et al. | 502/154 |
| 4,645,797 | 2/1987 | Suga et al. | 525/191 |
| 4,824,704 | 4/1989 | Suga et al. | 428/36.92 |

Primary Examiner—Joseph L. Schofer
Assistant Examiner—Tom Weber
Attorney, Agent, or Firm—Morrison Bennett

[57] ABSTRACT

Dicarbonyl compounds and alkylene oxides are used to deactivate a transition metal/organometal catalyst in polymerization of at least one monomer to form a 1-olefin polymer. The polymer is deashed with a lower alcohol optionally followed by a wash with the starting monomer or n-heptane.

12 Claims, No Drawings

DEASHING PROCESS FOR POLYOLEFINS

This application is a continuation patent application Ser. No. 07/730,318, filed on Jul. 15, 1991, now abandoned.

BACKGROUND OF THE INVENTION

This invention relates to catalyst deactivation and removal of catalyst residues from polymers.

Various reactions for polymerizing olefins are described in the literature. A typical approach is to carry out the polymerizations in the presence of a transition metal compound catalyst and an organometallic compound cocatalyst. One of the problems encountered with polymers prepared by such processes concerns the presence in the polymer of catalyst residues. The presence of these catalyst residues in the polymer adversely affects the heat stability, color, electrical properties and, in the case of clear resins, transparency. The halide components of catalyst residues can cause corrosion of processing and molding equipment.

For polyolefins which require high processing temperatures, catalyst removal is even more critical since higher temperatures may enhance adverse effect of catalyst residues.

The process by which catalyst residue impurities are removed, or extracted, from a polyolefin is referred to as "deashing". Various methods for extracting catalyst residues from polyolefins have been developed. These commonly involve treating the polymer with a variety of agents and adjuvants. Treating agents such as dicarbonyl compounds which contain the group

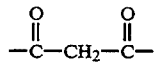

used in conjunction with alkylene oxide adjuvants have been shown to be useful for extracting catalyst residues from polyolefins such as polypropylene. (See U.S. Pat. No. 3,219,647). The dicarbonyl compounds also serve to deactivate the catalyst and cocatalyst thereby terminating the polymerization reaction. Additionally, the dicarbonyl compounds enhance the solubility of the catalyst residues for the subsequent extraction process. A subsequent rinse or wash of the polymer with an alcohol, a paraffinic hydrocarbon or monomer facilitates extraction.

The chelating reaction of dicarbonyl compounds with metal halide catalysts converts the metal to an extractable form and is accompanied by the evolution of hydrogen halide. Metal constituents of the organometallic cocatalyst also react with dicarbonyl compounds in this way. Depending on the nature of the cocatalyst, the reaction may also be accompanied by the evolution of hydrogen halide.

The alkylene oxide treating agent is employed as an adjuvant to remove the hydrogen halide which would otherwise inhibit the chelating reaction thereby slowing down the rate of metal extraction.

A particular problem has been observed when using conventional methods to remove catalyst residues from polyolefins of branched 1-olefin monomers, specifically those monomers with at least one substituent in the three position of the olefin. Catalyst removal from these polymers has been relatively ineffective, leaving high levels of catalyst residues in the polymer. This problem may be due to low productivity in the polymerization process. Polymerizations of branched 1-olefins are typically low yield reactions due to the sterically hindered structure of the monomer. As a result, catalyst residues will exist at high levels in the polymer. Another reason for this problem could be the greater solvent resistance of these polymers which would make them less penetrable to the treating agents and wash liquid thereby preventing effective extraction of the catalyst residues.

SUMMARY OF THE INVENTION

It is an object of this invention to obtain good removal of catalyst residues from polymers of branched 1-olefin monomers.

In accordance with one embodiment of this invention a method is provided which overcomes these difficulties by use of large proportionate amounts of chelating agents and certain adjuvant materials followed by one or more suitable washes. The wash or washes may be: (a) one or more alcohols; (b) one or more alcohols preceeded by or followed by one or more hydrocarbon washes; or (c) one or more hydrocarbon washes. The hydrocarbon washes may be any of various hydrocarbons, particularly paraffinic hydrocarbons or one or more of the same olefin monomers used in the polymerizations. Use of these invention methods substantially reduces the catalyst residue impurities in the polymerization products of 1-olefin monomers branched in the three position.

One embodiment of this invention is a process comprising deactivating the catalyst remaining after polymerization of at least one monomer to form a slurry containing at least one branched 1-olefin polymer; wherein from about 8 to about 50 molar equivalents based on total molar equivalents of metal compounds present of a chelating dicarbonyl compound and from about 8 to about 50 molar equivalents based on total molar equivalents of halide present of an alkylene oxide adjuvant are used for said deactivation; and wherein said catalyst comprises: (a) a transition metal compound chosen from the group consisting of time elements in Groups IV, V, VI and VII of the Periodic Table; and (b) an organometallic compound cocatalyst selected from the group of elements in Groups I, II and III of the Periodic Table.

In another embodiment of this invention, after deactivation of the catalyst, unreacted monomer is vented from the slurry of unreacted monomer, solubles and polymer before the polymer and solubles are washed at least once with a suitable wash.

DETAILED DESCRIPTION OF THE INVENTION

One commonly used method of making valuable high melting point 1-olefin polymers is polymerization of appropriate monomers using a transition metal/organometal catalyst system.

Generally most desired are crystalline polymers with highly ordered backbone structures, the generally more preferred of which would be those having an isotactic structure. Generally, least desired are highly atactic, randomly structured polymers referred to in this application as "soluble polymer" or simply as "solubles". Polymers considered useful in this invention are polymers of branched 1-olefin monomers, specifically those monomers with at least one substituent in the 3- position of the olefin. Examples include homopolymers of 3-methyl-1-butene, 3-methyl-1-pentene, 3-methyl-1-hexene, 3-methyl-1-heptene, 3-methyl-1-octene, 3-methyl-1-nonene, 3,4-dimethyl-1-pentene, 3,4-dimethyl-1-hexene, 3,3-dimethyl-1-butene, 3,3-dimethyl-1-pentene, 3-ethyl-1-pentene, 3-ethyl-1-hexene, 3-ethyl-1-heptene; copolymers of any two or more of the aforementioned branched 1-olefins; and copolymers of the aforementioned branched 1-olefins with 1-olefin monomers and polyenes having 2 to 30 carbon atoms examples of which include ethylene, propylene, 1-butene, 1-hexene, 1-octene, 1-hexadecene, 4-methyl-1-pentene, 1,3-butadiene, and 1,9-decadiene. Presently preferred are polymers of 3-methyl-1-butene and its copolymers with other 1-olefins and polymers of 3-methyl-1-pentene and its copolymers with other 1-olefins.

First and second generation transition metal/organometal catalyst systems may be used in the practice of this invention. These systems comprise a catalyst selected from a metal compound of an element from Groups IV, V, VI and VII of the Periodic Table and a cocatalyst selected from an organometal compound of an element chosen from Groups I, II and III of the Periodic Table. Commonly the catalyst is an inorganic or organic compound of titanium or vanadium, generally titanium. Titanium halides such as the trihalides and tetrahalides, e.g., $TiCl_3$, $TiCl_4$, are often used. The cocatalyst is generally an organoaluminum compound such as an alkylaluminum and/or alkylaluminum halide. Suitable examples include, but are not limited to, triethylaluminum, trimethylaluminum, triisobutylaluminum, diethylaluminum chloride, ethylaluminum sesquichloride, and the like.

Third and fourth generation catalysts which are contemplated as useful in the practice of this invention are solid compounds comprising Ti, Mg and a halogen, especially chlorine, all in combined form. In presently preferred catalysts, the atom ratio of Mg to Ti can range from about 10 to about 25, more preferably from about 14 to about 22. Other compounds can be included in the catalyst including aluminum trichloride, silica, electron donors such as esters, ethers, phenols and the like and mixtures thereof. When used the inorganic compounds will constitute from about 0.5 to about 10 weight percent of the finished catalyst. When used the electron donor(s) can initially constitute from about 5 to about 25 weight percent of the finished catalyst. The amount actually retained can be less depending upon the volatility of the electron donor and the method employed during the mixing process, e.g., temperature, duration of process and other variables. The retained amount can be readily determined by one skilled in analysis.

The catalyst used can be prepared in the manner described in Example I of U.S. 4,425,257 which is hereby incorporated herein by reference. The presently preferred cocatalyst is triethylaluminum (TEA). Mole ratios of TEA to titanium in the catalyst system can range from about 1 to about 250 or more, preferably from about 10 to about 60.

Although not essential, it is often desirable to carry out the polymerization in the presence of hydrogen. The molecular weight of the polymer formed is regulated by the amount of elemental hydrogen present during polymerization. The greater the hydrogen present, the lower the polymer molecular weight.

The polymers formed are more or less crystalline with an ordered backbone structure. Several structures are possible such as atactic (random), isotactic (greatly desired, similar R groups on one side of the main chain) and syndiotactic (similar R groups alternate on either side of the main chain).

To enhance stereospecificity, one or more adjuvants such as electron donors (alcohols, esters, ethers, phenols, etc.) can be used with either the catalyst or cocatalyst or both. Alcohols, esters, ethers or phenols would be added when making the catalyst or cocatalyst or both. The silanes can be added later. Adding such compounds to increase stereospecificity can decrease catalytic activity, however.

One embodiment of the invention is the use of a chelating dicarbonyl compound and an alkylene oxide (and/or chemically related compounds) to deactivate the catalyst remaining after polymerization of at least one branched 1-olefin monomer to form at least one branched 1-olefin polymer and to convert the catalyst residues into a soluble form which can be washed out of the polymer with a suitable liquid.

The dicarbonyl compounds used with the adjuvants of this invention are those materials containing the group:

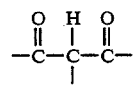

Such materials are those selected from the group consisting of (a) compounds of the general formula:

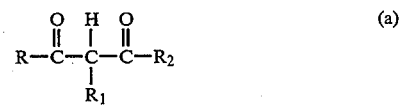

and (b) compounds of the general formula:

In compound (a) each R and $R_2$ can be an alkyl, cycloalkyl, aryl, aralkyl, alkaryl, alkylcycloalkyl, or cycloalkylalkyl group or R and $R_2$ can be joined to form a cyclic structure and $R_1$ can be hydrogen or an alkyl, cycloalkyl, aryl, alkaryl, aralkyl, alkylcycloalkyl, cycloalkylalkyl group, the number of carbon atoms in each R and $R_1$ being from 1 to 8.

In compound (b) $R_3$ is an alkyl, cycloalkyl, aryl, aralkyl, alkaryl, alkylcycloalkyl, cycloalkylalkyl group or an $OR_5$ group; $R_4$ is hydrogen or a hydrocarbon group as defined for $R_3$; and $R_5$ is a hydrocarbon group as defined for $R_3$, the number of carbon atoms in $R_3$, $R_4$, and $R_5$ being from 1 to 8.

Typical of such compounds are 2,4-pentanedione (acetylacetone), 2,4-hexanedione, 2,4-heptanedione, 5-methyl-2,4-hexanedione, 2,4-octanedione, 5,5-dimethyl-2,4-hexanedione, 3-ethyl-2,4-pentanedione, 2,2-dimethyl-3,5-nonanedione, 1-cyclohexyl-1,3-butanedione, 5,5-dimethyl-1,3-cyclohexanedione, 1-phenyl-1,3-butanedione, 1-(4-biphenylyl)-1,3-butanedione, 1-phenyl-1,3-pentanedione, 1-phenyl-5,5-dimethyl-2,4-hexanedione, 1,3-diphenyl-1,3-propanedione, 1,4-diphenyl-1,3-butanedione, 1-phenyl-2-benzyl-1,3-butanedione, 1-phenyl-3-benzyl-9,11-nonadecanedione, 8,10-heptadecanedione, 8-ethyl-7,9-heptadecanedione, 6-octyl-5,7- undecanedione, 4-phenyl-3,5-heptanedione, 1,3-cyclohexanedione, ethyl acetoacetate, methyl acetoacetate, n-propyl acetoacetate, isopropyl acetoacetate, tert-butyl acetoacetate, diethyl malonate, dimethyl malonate, di-n-propyl malonate, diisopropyl malonate, di-tert-butyl malonate, octyl acetoacetate, heptyl acetoacetate, phenyl acetoacetate, diphenyl malonate, dicyclohexyl malonate, dicyclohexyl octylmalonate, dihexyl phenylmalonate, ethyl 3-oxopentanoate, octyl-3-oxoundecanoate, methyl 3-oxo-4-phenylbutanoate, ethyl 3-oxo-5-phenylpentanoate, octyl 3-oxo-2-phenylundecanoate, octyl 3-oxo-2-octylundecanoate, cyclohexyl 3-oxo-6-cyclopentylhexanoate, and the like.

Of the various compounds represented by these formulas, acetylacetone is presently preferred.

The alkylene oxides used as adjuvants in the present invention are compounds containing from 2 to 8 carbon atoms and which include in their molecular structure at least one oxirane group with the structure

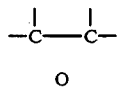

These compounds can be represented by the general formula:

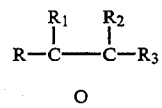

in which each R, $R_1$, $R_2$, and $R_3$ can be a hydrogen atom, an alkyl, cycloalkyl, or aryl group, or an epoxy-containing cyclic or all cyclic hydrocarbon group; and in which R and $R_3$ can be joined to form a carbocyclic group.

Typical compounds of this type include: epoxyethane, 1,2-epoxypropane, 1,2-epoxybutane, 2,3-epoxybutane, 1,2,3,4-diepoxybutane, 1,2,4,5-diepoxypentane, 1,2,4,5,7,8-triepoxyoctane, 2,3-epoxy-2,3-dimethylbutane, 2,3-epoxy-2-methyl-3-ethylpentane, epoxyethylbenzene, epoxyethylcyclohexane, epoxyethyl-3,4-epoxycyclohexane, 1,2-epoxycyclohexane, 1,2-epoxycyclopentane, and the like.

The chelator and adjuvant can be introduced directly by themselves into the reactor, or they can be added separately, or in combination in solution in an inert hydrocarbon.

The molar equivalents of the dicarbonyl compound needed are based on the total molar equivalents of the metal compounds present and the molar equivalents of alkylene oxide needed are based on the molar equivalents of halide present. The molar equivalents of the dicarbonyl compound to total metal compound equivalents can range from about 8 to 50 or more. A presently preferred range of about 9 to about 40 is favored and most preferred is a range of about 9 to about 12. The molar equivalents of alkylene oxide to total halide can range from about 8 to 50 or more, more preferably from about 9 to about 40, and most preferably from about 9 to about 12, based on the molar equivalents of halide present.

Another embodiment of this invention comprises the deashing of the polymer containing the deactivated and solubilized catalyst residues produced by transition metal/organometal polymerization of a branched, 1-olefin monomer; addition of at least 8 molar equivalents of a dicarbonyl compound based on total molar equivalents of the metal compounds present and at least 8 molar equivalents of an alkylene oxide based on the molar equivalents of halide present; and draining or flashing the unreacted monomer from the polymer slurry. The deashing of the polymer is accomplished by contacting and mixing the polymer contained in the reactor in the substantial absence of oxygen and moisture at least once with a lower alkanol, preferably isopropanol or methanol, optionally followed or preceeded by a hydrocarbon wash such as with n-heptane or with a monomer identical to at least one of the monomers being polymerized.

More than one alcohol wash may be used, either in a process using only alcohol washes or in a process using alcohol washes followed or preceeded by one or more hydrocarbon washes such as with n-heptane or with a monomer identical to at least one of the monomers being polymerized. Generally, lower alkanols with from 1 to about 8 carbon atoms ore considered most useful as alcohol washes.

Alternatively, the polymer produced as described above can be washed with only monomer identical to at least one of the monomers being polymerized. This method obviates the need for additional waste streams to deal with alcohols or other hydrocarbon washes such as the commonly used n-heptane.

In another embodiment of this invention a branched 1-olefin monomer is polymerized using a transition metal/organometal catalyst, the polymerization reaction is deactivated with at least 8 molar equivalents of a dicarbonyl compound based on total molar equivalents of the metal compounds present and at least 8 molar equivalents of an alkylene oxide based on the molar equivalents of halide present. Then, instead of draining the unreacted monomer and the solubles off in a waste stream, the unreacted monomer is vented from the reaction leaving the solubles with the polymer. In polymerization of 1-olefin monomers which are branched in the three position, the reaction product formed may contain up to about 10 percent solubles. After venting the unreacted monomer, the polymer product containing the solubles is washed in a suitable manner. Resin properties of polymers produced in this way may be somewhat affected, but the resins can be useful for certain applications.

The polymerizations of the embodiments of this invention can be carried out using either continuous or batch processes.

EXAMPLES

The following examples will be used to describe the invention and should be taken as illustrative and not restrictive.

In all the examples included herein, 3-methyl-1-butene or 3-methyl-1-pentene was polymerized in a stainless steel, jacketed, stirred reactor of 1-gallon capacity by contact with a catalyst comprising $TiCl_4$ supported on $MgCl_2$ and an organoaluminum compound as cocatalyst. Both the catalyst and cocatalyst are known in the art. The catalyst can be formed as described in U.S. Pat. No. 4,425,257 which is incorporated herein by reference by ball milling or vibratory milling the components in an inert atmosphere for up to 48 hours. The catalyst employed in these examples contained about 2.0 weight percent Ti, 25.0 weight percent Mg, 0.7 weight percent Al and 73.0 weight percent combined chlorine. Presently preferred organoaluminum compounds are alkylaluminum compounds such as triethylaluminum (TEA).

Under a nitrogen purge, the clean, dry reactor was charged with a weight portion (0.12 to 0.17 g) of catalyst, 5.0 mL of a 15 weight percent solution of TEA in n-heptane (which is equivalent to 4.65 mmole TEA) and then sealed. Two liters of monomer was drained into the reactor from a reservoir, 25 psig of hydrogen or an amount as specified in each of the individual examples was added from a 300 mL cylinder of hydrogen, the reactor was heated to 100° C. and maintained at that temperature for 1 hour unless specified otherwise. The polymerization was terminated and the polymer isolated as described in the examples.

The catalyst contained in the polymerization mixture was deactivated in the absence of oxygen and moisture. Likewise, polymer containing the deactivated catalyst residues was also washed in the reactor in the absence of oxygen and moisture. Thereafter, the catalyst residues were generally inert to oxygen and moisture. The polymer containing the treated catalyst residues generally exhibited little or no color development. The recovered solid polymer was removed from the reactor, allowed to air-dry overnight at ambient temperature and further dried in a vacuum oven at 75° C. for 2 hours.

The amount of soluble polymer contained in the monomer was determined by evaporating the monomer separated from the polymer slurry and weighing the dry residue. Productivity was then determined by dividing the total weight of polymer (solid plus solubles) by the weight of catalyst and expressed as grams polymer per gram catalyst (g/g). Catalyst residue amounts contained in the polymer were measured by plasma analysis for Ti, Mg and Al and by neutron activation to analyze for the chloride. Results shown in tables I through VIII have been rounded off to the nearest ppm.

Example I

Control samples were prepared in this example. After a one hour polymerization run, the unreacted monomer was drained into a grounded pan to recover the soluble polymer. A 2-liter portion of wash liquid, if used, was charged to the reactor containing the solid polymer and the mixture stirred for ½ hour at 80° C. The wash liquid was then drained. The solid polymer was then recovered, dried and weighed. The results are given in Table I.

TABLE 1

Effectiveness of Wash Liquids for Catalyst Residue Removal

| Run No. | Grams of Polymer Made Solid | Grams of Polymer Made Monomer-Soluble | Soluble Polymer, Wt. % | Productivity,[a] g/g | Catalyst Residues, ppm Ti | Mg | Al | Cl | Wash Liquid |
|---|---|---|---|---|---|---|---|---|---|
| 1 | 27.7 | 13.2 | 9.37 | 1040 | 14 | 176 | 162 | 693 | None |
| 2 | 30.3 | 13.6 | 10.4 | 1019 | 12 | 155 | 98 | 654 | n-heptane |
| 3 | 27.2 | 12.5 | 8.95 | 993 | 14 | 178 | 116 | 668 | 3MB1[b] |
| 4 | 21.6 | 11.8 | 8.84 | 881 | 11 | 68 | 134 | 338 | Methanol[c] |
| 5 | 67.8 | 16.8 | 9.10 | 1100 | 11 | 83 | 121 | 375 | H$_2$O/Methanol[d] |
| 6 | 24.1 | 12.9 | 9.42 | 1055 | 10 | 52 | 153 | 254 | Isopropanol[e] |

[a]Productivity was determined by dividing the total weight of polymer (solid plus solubles) by the weight of catalyst and expressed as grams polymer per gram catalyst (g/g).
[b]3MB1 is 3-methyl-1-butene.
[c]Substantially anhydrous methanol was used.
[d]A 5/95 mixture of water/methanol was used.
[e]Substantially anhydrous isopropanol was used.

The results in Table I indicate that alcohols are more effective than hydrocarbons for removing magnesium and chloride catalyst residues from poly(3-methyl-1-butene), abbreviated hereafter as PMB. The hydrocarbon washes alone were generally only slightly better than no wash at all. In comparing runs 4 and 5 it is apparent that dry methanol is somewhat more efficient than wet methanol in removing magnesium. Catalyst residue removal was not acceptable in any of these control runs. The polymers would be expected to exhibit discoloration, thermal and/or oxidative degradation and mold corrosion when used in molding applications.

The results also show that about 10 weight percent monomer-soluble polymer is produced during polymerization of 3-methyl-1-butene under the conditions employed.

Example II

Each polymerization run was terminated by adding methanol as a catalyst deactivating agent (kill agent) except for run 1 in which no deactivating agent was used. Run 1 is the same as run 1 in Table I and is repeated for comparative purposes. The kill agent was stirred with the reactor contents for 15 minutes at 100° C., then unreacted monomer was drained into a pan as before. The solid polymer and soluble polymer were recovered, dried and weighed as before. The results obtained are given in Table II.

TABLE II

Results of Use of Methanol Alone as a Deactivating Agent

| Run No. | Grams of Polymer Made Solid | Grams of Polymer Made Monomer-Soluble | Productivity,[a] g/g | Equivalents[b] of Methanol | Catalyst Residues, ppm Ti | Mg | Al | Cl | Wash Liquid |
|---|---|---|---|---|---|---|---|---|---|
| 1 | 7.7 | 13.2 | 1040 | 0 | 14 | 176 | 162 | 693 | None |
| 2 | 3.2 | 8.6 | 930 | 1 | 17 | 183 | 179 | 714 | None |
| 3 | 8.2 | 13.7 | 1031 | 9 | 13 | 163 | 338 | 712 | None |

TABLE II-continued

Results of Use of Methanol Alone as a Deactivating Agent

| Run No. | Grams of Polymer Made Solid | Grams of Polymer Made Monomer-Soluble | Soluble Productivity,[a] g/g | Equivalents[b] of Methanol | Catalyst Residues, ppm Ti | Mg | Al | Cl | Wash Liquid |
|---|---|---|---|---|---|---|---|---|---|
| 4 | 9.8 | 13.3 | 972 | 27 | 14 | 170 | 855 | 686 | None |

[a]Productivity was determined by dividing the total weight of polymer (solid plus solubles) by the weight of catalyst and expressed as grams polymer per gram catalyst (g/g).
[b]Equivalents of methanol/total metals (Ti, Mg, Al) and equivalents of methanol/chloride.

The results in Table II show that methanol alone, at least when no wash liquid is used to remove any solubilized catalyst residue, is no more effective than employing no deactivating agent at all.

Example III

Each one hour polymerization run was terminated by charging to the reactor as the deactivating agent a mixture of acetylacetone (AA) and propylene oxide (PO).

The use of such mixtures is known in the art; see, for example, U.S. Pat. No. 3,219,647, column 7, lines 54–62. However, in this reference the amounts of AA and PO employed each range from 1 to 5 equivalents. The AA serves to solubilize metal components in the catalyst residue and the PO serves to scavenge chloride in the catalyst residues. In the invention of this application the amounts can range from about 8 to about 50 equivalents/total metals and from about 8 to about 50 equivalents/chloride present.

The reactor mixture was stirred for 15 minutes at 100° C., unreacted monomer was drained into a pan and 2 liters of the designated wash liquid, if employed, was added to the reactor. The polymer and wash liquid were mixed for 30 minutes at 80° C. then the wash liquid was drained into a pan. The solid polymer and monomer-soluble polymer were recovered, dried and weighed as before. The results obtained are presented in Table III.

The results in Table III are arranged in groups of three for easier comparison of results at each deactivator equivalent level. The results show that irrespective of the equivalents of AA-PO used and in the absence of a wash liquid the combination is much more affective than using methanol alone as the deactivating agent.

Use of either n-heptane or methanol to wash out catalyst residues solubilized by the deactivating system is more effective at all AA-PO levels than with use of no wash at all. The results show that the improvement is directly proportional to the equivalent levels used with the best results obtained at 9 or more equivalents of AA-PO. At these levels, Ti was essentially removed with either wash liquid. Methanol proved to be somewhat more efficient than n-heptane in reducing Mg or chloride and less efficient in reducing the Al levels. Runs 9 and 12 show a single wash with methanol can reduce catalyst residues to an acceptable level.

Example IV

Each one hour polymerization run was terminated by adding 9 equivalents of AA-PO to the reactor and mixing the contents for 15 minutes at 100° C. Unreacted monomer was then drained into a pan and a wash liquid consisting of a hydrocarbon and/or alcohol charged to the reactor. The mixture was stirred for 30 minutes at 80° C. and the wash liquid was drained into a pan. The solid polymer and monomer-soluble polymer were recovered, dried and weighed as before. The results are given in Table IV.

TABLE III

Results of Use of Acetylacatone and Propylene Oxide as Deactivating Agents

| Run No. | Grams of Polymer Made Solid | Grams of Polymer Made Monomer-Soluble | Productivity,[a] g/g | Deactivator/ Equivalents[b] | Catalyst Residues, ppm Ti | Mg | Al | Cl | Wash Liquid |
|---|---|---|---|---|---|---|---|---|---|
| 1 | 131.9 | 13.7 | 955 | AA-PO/1 | 10 | 182 | 157 | 658 | None |
| 2 | 121.2 | 16.2 | 972 | AA-PO/1 | 9 | 183 | 95 | 592 | n-heptane |
| 3 | 153.8 | 15.3 | 1173 | AA-PO/1 | 1 | 49 | 92 | 235 | Methanol |
| 4 | 135.3 | 15.0 | 1011 | AA-PO/3 | 4 | 166 | 72 | 408 | None |
| 5 | 121.4 | 14.9 | 1078 | AA-PO/3 | 1 | 126 | 17 | 273 | n-heptane |
| 6 | 145.2 | 15.6 | 980 | AA-PO/3 | 1 | 41 | 23 | 161 | Methanol |
| 7 | 138.4 | 14.6 | 1044 | AA-PO/9 | 3 | 93 | 72 | 182 | None |
| 8 | 142.6 | 15.8 | 1015 | AA-PO/9 | 1 | 69 | 11 | 140 | n-heptane |
| 9[c] | 136.6 | 14.4 | 888 | AA-PO/9 | 0 | 12 | 18 | 72 | Methanol |
| 10 | 141.4 | 15.2 | 1123 | AA-PO/27 | 2 | 65 | 62 | 101 | None |
| 11 | 116.1 | 14.0 | 858 | AA-PO/27 | 0 | 69 | 9 | 62 | n-heptane |
| 12[c] | 131.3 | 15.6 | 990 | AA-PO/27 | 0 | 8 | 19 | 54 | Methanol |

[a]Productivity was determined by dividing the total weight of polymer (solid plus solubles) by the weight of catalyst and expressed as grams polymer per gram catalyst (g/g).
[b]AA = acetylacetone, PO = propylene oxide. Equivalents of AA/total metals (Ti, Mg, Al) and equivalents of PO/chloride.
[c]Invention run.

TABLE IV

Results of Use of Larger Amounts of Acetylacetone and Propylene Oxide as Deactivating Agents

| Run No. | Grams of Polymer Made Solid | Grams of Polymer Made Monomer-Soluble | Productivity,[a] g/g | Catalyst Residue, ppm Ti | Mg | Al | Cl | Wash Liquid[b] |
|---|---|---|---|---|---|---|---|---|
| 1 | 149.2 | 12.0 | 1000 | 1 | 112 | 10 | 227 | 3MB1 |
| 2[c,d] | 136.6 | 14.4 | 888 | 0 | 12 | 18 | 72 | Methanol |
| 3[d] | 123.5 | 13.3 | 945 | 0 | 3 | 10 | 37 | Isopropanol |
| 4 | 93.8 | 10.0 | 845 | 2 | 145 | 14 | 344 | n-Heptane/n-Heptane |
| 5 | 139.5 | 15.2 | 1013 | 1 | 102 | 9 | 219 | 3MB1/3MB1 |
| 6[d] | 123.1 | 13.6 | 945 | 0 | 19 | 12 | 82 | Methanol/Methanol |
| 7[d] | 124.2 | 11.6 | 892 | 0 | 19 | 5 | 70 | Isopropanol/Isopropanol |
| 8 | 122.2 | 10.6 | 872 | 0 | 11 | 16 | 88 | n-Heptane/Methanol |
| 9[d] | 111.2 | 13.3 | 927 | 0 | 14 | 7 | 61 | Methanol/n-Heptane |
| 10 | 132.1 | 15.3 | 872 | 0 | 25 | 15 | 112 | 3MB1/Methanol |
| 11[d] | 124.0 | 12.9 | 939 | 0 | 20 | 10 | 89 | Methanol/3MB1 |
| 12 | 121.0 | 12.9 | 844 | 1 | 36 | 5 | 106 | n-Heptane/Isopropanol |
| 13[d] | 133.4 | 13.2 | 962 | 0 | 19 | 3 | 64 | Isopropanol/n-Heptane |
| 14 | 136.4 | 14.0 | 965 | 1 | 37 | 3 | 102 | 3MB1/Isopropanol |
| 15[d] | 120.5 | 14.8 | 876 | 0 | 9 | 4 | 60 | Isopropanol/3MB1 |

[a]Productvity was determined by dividing the total weight of polymer (solid plus solubles) by the weight of catalyst and expressed as grams polymer per gram catalyst (g/g).
[b]3MB1 is 3-methyl-1-butene.
[c]Run 9 of TABLE III is repeated for convenience in comparing data.
[d]Invention run.

Inspection of the results in Table. IV for runs 1 through 3 show that alcohols are more efficient than 3MB1 in washing solubilized catalyst residues from treated polymer. It is apparent that isopropanol is also more efficient than methanol, particularly in reducing Mg, Al and Cl residues. The results depicted in run 3 show one embodiment of the invention where catalyst residues solubilized according to a preferred level of 9 equivalents AA-PO per total metals (Ti, Al and Mg) and 9 equivalents AA-PO for total chloride present are removed to an acceptable level employing a single isopropanol wash. The remaining runs in which two washes are used after deactivation indicate that no advantage is gained whether the compounds in the two washes are the same or different. The results do show that better results are obtained when the first wash is an alcohol followed by a hydrocarbon rather than the reverse.

Example V

Each one hour polymerization run of this example was terminated by adding 9 equivalents of AA-PO to the reactor as before. After stirring the reactor contents for 15 minutes at 100° C. the monomer was drained into a pan. Two liters of isopropanol was added to the reactor and the contents stirred for ½ hour at the designated temperatures. The solid polymer and monomer-soluble polymer were recovered, dried and weighed as before. The results are shown in Table V.

TABLE V

Effects of Wash[a] Temperature on Catalyst Residue Removal

| Run No. | Grams of Polymer Made Solid | Grams of Polymer Made Monomer-Soluble | Productivity,[b] g/g | Wash Temperature, °C. | Catalyst Residue, ppm Ti | Mg | Al | Cl |
|---|---|---|---|---|---|---|---|---|
| 1 | 152.5 | 12.7 | 939 | 40 | 1 | 47 | 18 | 119 |
| 2 | 154.1 | 14.4 | 1083 | 60 | 0 | 17 | 9 | 80 |
| 3 | 123.5 | 13.3 | 945 | 80 | 0 | 3 | 10 | 37 |
| 4 | 154.5 | 14.0 | 870 | 100 | 0 | 6 | 6 | 80 |
| 5 | 127.8 | 11.2 | 871 | 120 | 0 | 6 | 12 | 101 |

[a]Isopropanol wash was used for each of these five runs.
[b]Productivity was determined by dividing the total weight of polymer (solid plus solubles) by the weight of catalyst and expressed as grams polymer per gram catalyst (g/g).

Inspection of the results shown in Table V clearly indicate that wash temperatures lower than 80° C. are less efficient in removing magnesium and chloride residues than at 80° C. Wash temperatures greater than 80° C. result in higher chloride levels. These results show that a wash temperature of at or near 80° C. is optimum for deashing efficiency.

Example VI

The effect of catalyst residues in the polymer upon its melt flow stability at an elevated temperature with time was determined by employing a standard plastometer as descried in ASTM D-1238-88 at 320° C. under a 5 Kg load after various hold times. In this test, 3.3 g of the polymer was charged to the plastometer and held at 320° C. for the specified time under a load of 360 g. Total weight was then increased to 5 Kg and the melt flow determined.

The polymer used in run 1 was produced in a one hour run at 100° C. The reaction was terminated by adding 3 equivalents of methanol to the reactor and stirring the contents for 15 minutes at 100° C. After draining unreacted monomer the reactor was charged with 2 liters of reagent grade n-heptane and the contents were mixed for ½ hour at 80° C. The solid polymer and monomer-soluble polymer were recovered, dried and weighed as before. The resins shown in runs 2 and 3 were previously shown in run 4, Table I and run 3, Table IV, respectively. The catalyst residue content of each polymer and the melt flow stability results are presented in Table VI. None of the polymers contained stabilizers.

TABLE VI

Melt Stability of Selected Resins at 320° C.

| Run No. | Catalyst Residue, ppm | | | | Melt Flow, g/10 minutes after Hold Time of | | | Percent[a] Change | Melt[b] Appearance |
|---|---|---|---|---|---|---|---|---|---|
| | Ti | Mg | Al | Cl | 5 minutes | 10 minutes | 15 minutes | | |
| 1 | 18 | 173 | 519 | 741 | 149 | 370 | 593 | −298 | yellowish |
| 2 | 11 | 68 | 134 | 338 | 128 | 236 | 425 | −232 | few bubbles |
| 3 | 0 | 3 | 10 | 37 | 108 | 148 | 307 | −184 | no bubbles |

[a] 5 minutes value minus 15 minutes value divided by 5 minutes value x 100. Negative value indicates a decrease in melt stability.
[b] Observation made with 15 minute extrudate.

The results in Table VI show there is a direct correlation between the amount of catalyst residues in a polymer and its resistance to thermal degradation. Polymers containing low catalyst residues are more stable to heat than those containing higher levels of catalyst residues. This difference is significant in melt processing applications such as extrusion and injection molding where temperatures in excess of the polymer melting point (about 300° C.) would be needed to expedite processing times. Such temperatures could range, for example, from about 325 to about 420° C. or higher, in order to insure adequate fill of dies and molds. Of course, the polymers would have to be properly stabilized as known in the art to be useful at the temperatures needed. Suitable stabilizers, for example, can be selected from among 1,3,5-trimethyl-2,4,6-tris(3,5-di-t-butyl-4-hydroxybenzyl)benzene, bis(2,4-di-t-butylphenyl)pentaerythritol diphosphite, zinc stearate or mixtures thereof.

Example VII

A series of two hour polymerization runs were made at 100° C. in the reactor previously used. The amount of hydrogen added to the reactor varied as shown in the accompanying Tables 7A and 7B. Each run was terminated by charging 9 equivalents AA/PO to the reactor as before and stirring for 15 minutes at 80° C. In one series of runs following termination, monomer remaining in the reactor was vented to flare for disposal. Two liters of methanol was added to the reactor and the contents were stirred for 15 minutes at 80° C. The alcohol was then drained into a flask for subsequent recovery of methanol-soluble polymer contained therein. The solid polymer in the reactor was recovered as previously described. In a second series of runs (the counterpart of the first series) following termination, the monomer remaining in the reactor was drained into a pan. The reactor was charged with 2 liters of 3MB1 and the contents were stirred for 15 minutes at 80° C. The monomer was then drained from the reactor into a pan and 2 liters of methanol was charged to the reactor and stirred for 15 minutes at 80° C. The alcohol was then drained into a pan. The solid polymer and soluble polymer fractions were recovered, dried and weighed as before. The results obtained are presented in Tables 7A and 7B. Each run number in Table 7A and its corresponding run number in Table 7B are based on polymer produced in the same polymerization run.

TABLE 7A

Flash Recovery of Monomer Compared with Draining Monomer, Catalyst Residues Result

| Run No. | Process Used | Hydrogen Charge (psig) | Grams of Polymer Made | | Productivity g/g | Heptane Insoluble Content weight | Catalyst Residue, ppm | | | |
|---|---|---|---|---|---|---|---|---|---|---|
| | | | Solid | Monomer-Soluble | | | Ti | Mg | Al | Cl |
| 1 | Drain | 12.5 | 103.0 | 10.7 | 780 | 99.8 | 0 | 43 | 12 | 155 |
| 2 | Flash Recovery | 12.5 | 113.6 | — | 821 | 93.5 | 4 | 51 | 113 | 131 |
| 3 | Drain | 25 | 215.6 | 19.5 | 907 | 99.8 | 0 | 28 | 18 | 85 |
| 4 | Flash Recovery | 25 | 225.3 | — | 883 | 95.2 | 4 | 37 | 76 | 122 |
| 5[c] | Flash Recovery | 25 | 163.1 | — | 1127 | 92.7 | 2 | 28 | 70 | 129 |
| 6 | Drain | 50 | 302.6 | 27.6 | 748 | 99.5 | 0 | 30 | 9 | 89 |
| 7 | Flash Recovery | 50 | 371.2 | — | 856 | 93.5 | 4 | 42 | 50 | 107 |
| 8 | Drain | 100 | 550.6 | 39.1 | 977 | 98.9 | 1 | 42 | 14 | 108 |
| 9 | Flash Recovery | 100 | 556.2 | — | 1038 | 93.2 | 6 | 51 | 58 | 121 |

[a] Productivity was determined by dividing the total weight of polymer (solid plus solubles) by the weight of catalyst and expressed as grams polymer per gram catalyst (g/g).
[b] Determined by extracting solid polymer with n-heptane. Heptane insoluble content is then solid polymer weight minus weight heptane-soluble polymer divided by weight solid polymer × 100.
[c] Repeat of run 4.

TABLE 7B

Flash Recovery of Monomer Compared with Draining Monomer, Soluble Catalyst Results

| Run No. | Process Used | Reactor Solids[a] Weight % | Melt Flow, g/10 minutes | Soluble Polymer Recovered, Weight % | | | |
|---|---|---|---|---|---|---|---|
| | | | | Monomer[c] | Isopropanol Wash[d] | n-Heptane | Xylene[f] |
| 1 | Drain | 8.2 | 55 | 9.4 | 0.10 | 0.15 | 1.45 |
| 2 | Flash Recovery | 9.0 | 125! | n.a.9 | 0.96 | 6.52 | 7.42 |
| 3 | Drain | 17 | 42 | 8.3 | 0.04 | 0.24 | 1.05 |
| 4 | Flash Recovery | 18 | 106! | n.a. | 0.54 | 4.84 | 4.76 |
| 5 | Flash Recovery | 13 | n.a. | n.a. | 0.20 | 7.36 | 8.44 |
| 6 | Drain | 24 | 70 | 8.4 | 0.12 | 0.44 | 1.31 |
| 7 | Flash Recovery | 30 | 109! | n.a. | 0.27 | 6.50 | 5.83 |
| 8 | Drain | 44 | 51 | 6.6 | 0.09 | 1.13 | 2.17 |

TABLE 7B-continued

Flash Recovery of Monomer Compared with Draining Monomer, Soluble Catalyst Results

| Run No. | Process Used | Reactor Solids[a] Weight % | Melt Flow, g/10 minutes | Soluble Polymer Recovered, Weight % | | | |
|---|---|---|---|---|---|---|---|
| | | | | Monomer[c] | Isopropanol Wash[d] | n-Heptane | Xylene[f] |
| 9 | Flash Recovery | 44 | 72 | n.a. | 0.22 | 6.77 | 7.21 |

[a]Based on weight percent solid polymer in 2 liters monomer.
[b]Flow rate measured according to ASTM D1238-88.
[c]Weight percent of monomer-soluble polymer removed in the drain process. This polymer is waste material.
[d]Solubles in the alcohol wash in the flash recovery are the total waste material generated in this process. The remaining indicated solubles resulted from the test procedures.
[e]The n-heptane solubles were obtained in the determinations of heptane insoluble content of solid polymer.
[f]The xylene solubles were obtained from extraction of the solid polymer.
n.a. = not applicable.

The results in Table 7A show, as expected, that heptane-soluble content of the polymers increases when soluble polymer is retained with solid polymer. Thus, in viewing the results of run 1, drain process in comparison with run 2 (its counterpart in the flash process) the heptane-insoluble content of the polymers decreased from nearly 100% to about 93%. The catalyst residue results also indicate that polymer isolated in the flash process generally contains higher levels of metals and chlorides than that obtained in the drain process. In the drain process, unreacted monomer containing at least a portion of the solubilized catalyst residues is drained from the reactor and out of contact with the solid polymer remaining behind. The polymer is then washed. The wash liquid which now contains most of the remaining catalyst residues is drained, thus separating the residues from the polymer, In the flash process, catalyst residues are removed only by the wash liquid. This method would be expected to be somewhat less efficient when the same number and kind of chemical washes are performed. However, the levels obtained still result in polymers having acceptable levels for certain end-use applications.

The results in Table 7B show that monomer-soluble polymer is separated from solid polymer in the drain process but retained with the polymer in the flash process. This is evident based on the melt flow differences in the polymers between the two processes. In the drain process most of the monomer-soluble polymer which would be expected to have a higher melt flow is removed. The remaining polymer then has lower melt flow in comparison to a similar polymer which has the solubles retained.

The data also show that regardless of the solids level in the reactor, the amount of monomer-soluble polymer retained with solid polymer in the flash process is relatively unaffected. The waste material obtained in the alcohol wash represents the total waste generated by the flash process. It ranged from about 0.2 to about 1 weight percent of total polymer. Disposing of such small amounts is desirable, at least from a cost standpoint. The drain process, on the other hand, results in a higher level of solubles which consists of monomer-soluble polymer plus alcohol-soluble polymer. By dividing the total waste generated in the drain process with that generated in the counterpart flash process it can be shown that about 10 to about 30 times as much waste is generated in the drain process and must be disposed of or used in some way.

Example VIII

The effect on physical properties of polymer containing solubles compared with one having low levels of solubles was determined. The polymers were made in the fashion described previously. To provide sufficient resin for extrusion and formation of test specimens, the polymer resulting from two runs under substantially identical polymerization and subsequent treating conditions was blended together. One blend consisted of polymer containing solubles, the second blend consisted of polymers containing low soluble levels. The solubles levels of the polymers are similar to those shown in Example VII where drain polymer and flash polymer are described. The blend containing retained solubles consisted of 47 weight percent of polymer made in one run and 53 weight percent of polymer made in a substantially identical run made with substantially equal conditions. Similarly, the blend containing low solubles levels consisted of 42.6 weight percent polymer made in one run and 57.4 weight percent polymer made in a substantially identical manner. The catalyst residues in each polymer were determined as before. The difference in the catalyst levels for polymers obtained under the same conditions are very close. The values shown in Table VIII are average values. The results obtained are given in Table VIII. Each polymer blend was stabilized with 0.2 phr of hindered phenol, 0.3 phr of the diphosphite and 0.1 phr zinc stearate, previously mentioned in Example VI. The blends were processed in a twin-screw Brabender mixer employing zone temperatures of 330° C. and a die temperature of 325° C. The melt temperature was 353° C.

TABLE VIII

Selected Properties of Polymers with Solubles and Polymers Mainly Free of Solubles

| | Run Number | |
|---|---|---|
| | 1 | 2 |
| Properties | | |
| Solubles Present | yes | no |
| Melt Flow, Blend[a] | 65 | 45 |
| Tensile Strength, Break, psi[b] | 4040 | 4900 |
| Elongation, Break, psi | 2.5 | 4.1 |
| Flexural Strength, psi[c] | 6325 | 7845 |
| Flexural Modulus, psi[c] | 421,300 | 439,000 |
| Unnotched Izod Strength,[d] ft-lb/inch | 1.1 | 2.1 |
| Catalyst Residues | | |
| Titanium | 3 | 0 |
| Magnesium | 22 | 14 |
| Aluminum | 39 | 9 |
| Chlorine | 83 | 66 |

[a]ASTM D1238-88.
[b]ASTM D638-89.
[c]ASTM D790-86.
[d]ASTM D256-88.

The results in Table VIII show that the polymers employed contained catalyst residues in the levels previously described. The effect of solubles level on polymer properties is about what was expected. That is, solubles decreased the physical properties of the polymer to some extent. However, the solubles-containing polymer still possesses adequate strength and impact resistance for many applications.

Example IX

A series of runs was made to demonstrate the effectiveness of use of larger equivalent amounts of deactivating agents other than acetylacetone and propylene oxide. Polymerization was allowed to run for 1 hour using 3-methyl-1-butene as the starting monomer, the same catalyst and cocatalyst in the same amounts described in the introduction to these examples given above. Essentially the same reaction conditions described for Examples I through VIII were used for the polymerizations in runs 1 through 7 shown in Table IX.

Run 1 shown in Table IX was made using acetylacetone and propylene oxide as deactivating agents for purposes for comparison. Runs 2 and 3 were made using 9 equivalents/total metals of butyl carbitol and 9 equivalents/chloride of propylene oxide. Runs 4 and 5 were made using 9 equivalents/total metals of butyl carbitol and 9 equivalents/chloride of butylene oxide. Runs 6 and 7 were deactivated with 9 equivalents/total metals of acetylacetone and 9 equivalents/chloride of butylene oxide.

The reactor mixture was stirred for 15 minutes at 100° C., unreacted monomer was drained into a pan and two liters of the designated wash liquid was added to the reactor. The polymer and wash liquid were mixed for 30 minutes at 80° C. then the wash liquid was drained into a pan. The solid polymer and monomer-soluble polymer were recovered, dried and weighed as done in the previous examples. The results obtained are presented in Table IX. The results of the runs of this example show that butyl carbitol performs comparably to acetylacetone and that butylene oxide performs comparably to propylene oxide. This data supports the fact that dicarbonyl compounds other than acetylacetone and alkylene oxides other than propylene oxide are useful in this invention.

Example X

A one hour polymerization run was made using 3-methyl-1-pentene as the starting monomer. The run was terminated by adding 9 equivalents of AA-PO to the reactor as before. After stirring the reactor contents for 15 minutes at 100° C. the monomer was drained into a pan. Two liters of isopropanol was added to the reactor and the contents stirred for ½ hour at 80° C. The solid polymer and monomer-soluble polymer were recovered, dried and weighed as before. The results are shown in Table X.

TABLE X

Effectiveness of 9 Equivalents of Acetylacetone and Propylene Oxide for Deactivating 3-Methyl-1-Pentene Polymerization

| Grams of Polymer Made | |
| --- | --- |
| Solid | 205.1 |
| Monomer-Soluble | 15.5 |
| Soluble Polymer, wt.% | 7.0 |
| Productivity[a], g/g | 1497 |
| Catalyst Residues, ppm | |
| Ti | <.5 |
| Mg | 17 |
| Al | 40 |
| Cl | 87 |
| Wash Liquid | Isopropanol |

[a]Productivity was determined by dividing the total weight of polymer solid plus solubles) by the weight of catalyst and expressed as grams polymer per gram catalyst (g/g).

The results shown in Table X indicate that poly(3-methyl-1-pentene) can be deashed as effectively as poly(3-methyl-1-butene) by the methods of this invention, This data supports the fact that the invention methods work for any similar polymers, While the processes and compositions of this invention have been described in detail for the purpose of illustration, the inventive processes and compositions are not to be construed as limited thereby. This patent is intended to cover all changes and modifications within the spirit and scope thereof.

That which is claimed is:

1. A process for deactivating and removing catalyst residue remaining after polymerization of at least one 1-olefin monomer to form a polymer in the presence of a catalyst comprising:

(a) a metal compound chosen from the group consisting of the elements in Groups IV, V, VI, and VII of the Periodic Table; and (b) a cocatalyst selected from an organometal compound of an element chosen from Groups I, II and III of the Periodic Table, said process comprising:

contacting a mixture comprising said polymer and said catalyst residue with about 8 to about 50 molar equivalents, based on total molar equivalents of metal compounds present, of a dicarbonyl compound and from about 8 to about 50 molar equivalents, based on total molar equivalents of halide present, of an alkylene oxide; and thereafter

TABLE IX

Results of Use of Butyl Carbitol and Butylene Oxide as Deactivating Agents

| Run No. | Grams of Polymer Made | | Productivity,[a] g/g | Deactivator/ Equivalents[b] | Catalyst Residues, ppm | | | | Wash Liquid |
| --- | --- | --- | --- | --- | --- | --- | --- | --- | --- |
| | Solid | Monomer- Soluble | | | Ti | Mg | Al | Cl | |
| 1[c] | 137.0 | 17.2 | 943 | AA-PO/9 | <.5 | 30 | 30 | 120 | Isopropanol |
| 2 | 125.7 | 16.9 | 937 | BC-PO/9 | <.5 | 15 | 94 | 119 | Isopropanol |
| 3 | 117.5 | 13.1 | 819 | BC-PO/9 | <.5 | 21 | 93 | 127 | n-heptane |
| 4 | 93.6 | 14.2 | 818 | BC-BO/9 | <.5 | 28 | 174 | 148 | Isopropanol |
| 5 | 124.9 | 18.0 | 1027 | BC-BO/9 | <.5 | 26 | 124 | 164 | n-heptane |
| 6 | 110.0 | 15.4 | 881 | AA-BO/9 | <.5 | 20 | 36 | 112 | Isopropanol |
| 7 | 78.6 | 12.6 | 747 | AA-BO/9 | <.5 | 235 | 24 | 430 | n-heptane |

[a]Productivity was determined by dividing the total weight of polymer (solid plus solubles) by the weight of catalyst and expressed as grams polymer per gram catalyst (g/g).
[b]AA = acetylacetone, PO = propylene oxide, BC = butyl carbitol, BO = butylene oxide. Equivalents of AA/total metals (Ti, Mg, Al), equivalents of PO/chloride, equivalents of BC/total metals (Ti, Mg, Al) and equivalents of BO/chloride.
[c]Comparison run.

washing said mixture comprising said polymer and said catalyst residue in the substantial absence of oxygen and moisture at least once with at least one lower alkanol.

2. A process as recited in claim 1 wherein said dicarbonyl compound is one chosen from the group of acetylacetone and butyl carbitol and said alkylene oxide is one chosen from the group of propylene oxide and butylene oxide.

3. A process as recited in claim 1 wherein said at least one lower alkanol is isopropanol.

4. A process as recited in claim 1 wherein said at least one lower alkanol is methanol.

5. A process as recited in claim 1 wherein
said one 1-olefin monomer is 3-methyl-1-butene;
said catalyst is a titanium halide;
said cocatalyst is an organoaluminum compound;
said polymer is poly(3-methyl-1-butene); and
said lower alkanol is chosen from the group of methanol and isopropanol.

6. A process as recited in claim 1 wherein
said one 1-olefin monomer is 3-methyl-1-pentene;
said catalyst is a titanium halide;
said cocatalyst is an organoaluminum compound;
said polymer is poly(3-methyl-1-pentene); and
said lower alkanol is chosen from the group of methanol and isopropanol.

7. A process as recited in claim 1 wherein after said polymer is contacted in the substantial absence of oxygen and moisture with at least one lower alkanol, said polymer is washed with a hydrocarbon.

8. A process as recited in claim 7 wherein said hydrocarbon is at least one monomer identical to said at least one 1-olefin monomer.

9. A process as recited in claim 7 wherein said hydrocarbon is n-heptane.

10. A process as recited in claim 7 where in
said at least one 1-olefin monomer is 3-methyl-1-butene;
said catalyst is a titanium halide;
said cocatalyst is an organoaluminum compound;
said polymer is poly(3-methyl-1-butene);
said lower alkanol is chosen from the group of methanol and isopropanol;
said hydrocarbon is chosen from the group of n-heptane and 3-methyl-1-butene.

11. A process as recited in claim 7 wherein
said at least one 1-olefin monomer is 3-methyl-1-pentene;
said catalyst is a titanium halide;
said cocatalyst is an organoaluminum compound;
said polymer is poly(3-methyl-1-pentene);
said lower alkanol is chosen from the group of methanol and isopropanol;
said hydrocarbon is chosen from the group of n-heptane and 3-methyl-1-pentene.

12. A process as recited in claim 1 wherein unreacted monomer is vented from said mixture.

* * * * *